United States Patent Office 3,530,024
Patented Sept. 22, 1970

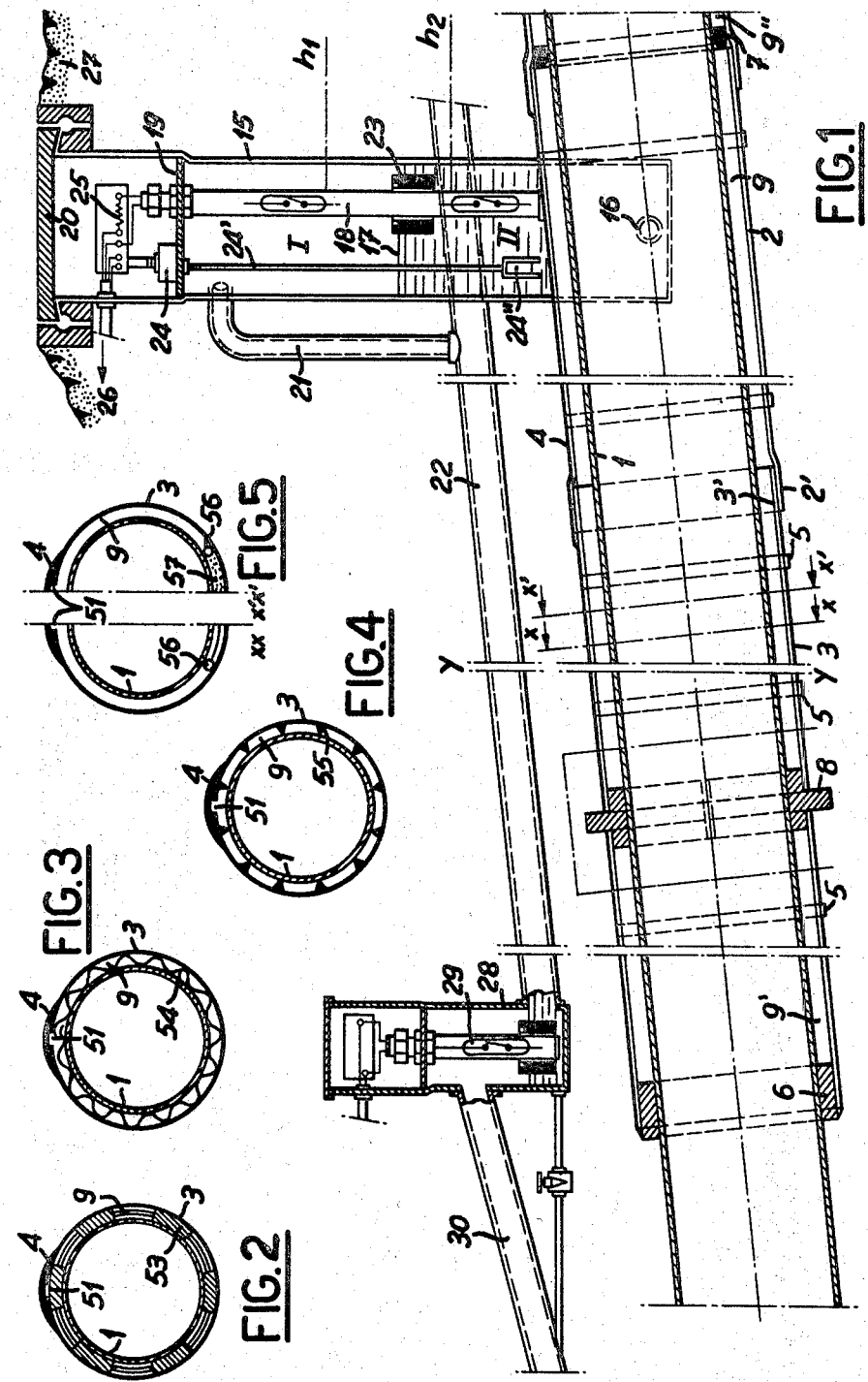

---

3,530,024
METHOD FOR FORMING PROTECTING CASINGS ON PIPELINES
Gerard F. Wittgenstein, 29 Chemin du Champrond, 1012 Lausanne, Switzerland
Original application May 15, 1967, Ser. No. 638,198. Divided and this application Apr. 28, 1969, Ser. No. 819,923
Int. Cl. F16i 57/00
U.S. Cl. 156—304       5 Claims

ABSTRACT OF THE DISCLOSURE

The disadvantageous consequences of the leakage of a pipeline are avoided by forming around the pipe at least one sealed annular compartment. This is done by circling the pipe with casing sections having at least one longitudinal cut therein, abutting these sections, and closing the cut.

---

The present application is a division of my copending application Ser. No. 638,198, filed on May 15, 1967.

The present invention relates to a method for the transformation of a pipeline in construction as in exploitation into a security pipeline; it consists in making around a section of a pipeline a casing concentric to said pipeline providing between said casing and the pipeline a series of annular tight spaces in which spacers are housed, this space will thereafter be filled with non-corrosive water, each annular space being separated from the adjacent spaces by tight partitions, a chimney is disposed beneath these partitions which houses detection devices and connects the annular space to the atmosphere.

This method can be used with advantage for application in underground pipelines conveying liquid hydrocarbons; it is also of interest for application in submarine pipelines conveying gaseous hydrocarbons. Thanks to this method, these pipelines are transformed into security pipelines.

In the first case, the aim of encasing the pipeline is the protection of the environment and particularly of the drinkable water; in the second case, the aim is the protection of the pipeline itself and of the high financial investment it represents which would be endangered if sea water would penetrate within the pipe through cracks thereof.

In the first case, there are numerous successive annular spaces depending on the layout since it is important to avoid in each of them an excessive static pressure at the filling of water.

In the second case, there are mainly one or two annular spaces, the chimneys being located on the beach.

The method according to the present invention consists in forming around a pipeline transporting a hydrocarbon at least one annular chamber containing spacers and communicating with the atmosphere. The chamber separates the pipe from a casing encircling the pipe. The casing is sealed at its ends on the pipe and the chamber is filled with a fluid, preferably a liquid such as distilled or demineralized water, normally stationary, subject only to its static pressure. Before encircling the pipe, partitions can be fixed on said pipe to provide several tight chambers within the casing. The casing is split along its entire length by at least one longitudinal cut and is sealed by a weld, a seam, a covering strip or plug or the like. The casing may also be formed by a plurality of elements abutted and secured together.

To encase the pipe with a casing having only one joint cut, it is enough to split the casing lengthwise and place it about the pipe, after which the casing is rotated on the pipe so that the split is at the top of the pipe and can readily be closed.

The casing can be made of a thermosetting resin such as a polyester reinforced with glass fibers, or any other suitable material.

Alternatively, the pipe can be encircled with part shells of casing, for example two, which are applied to the pipe and then secured together, the number of joints or cuts that must be closed being equal to the number of sections that are used.

In any event, there is no occasion to slide a casing on a pipeline or a pipeline inside a casing, so that the method of the present invention is usable in connection with pipelines that have already been laid and which are even in operation.

At each crest of the chamber, that is at a point where the pipeline is at an elevation higher than the portions of the pipelines located within said chamber, the casing opens into a chimney at atmospheric pressure. Detective equipment for detecting pipe and casing cracks is immersed at least partially in the fluid in the chimney, which is the same fluid as in the annular chamber within the casing, and this detection equipment is connected to an electrical receiver and remote control devices influenced by the detection system. Alternatively, the surface of the water in the chimney can be covered by a lighter liquid having a lower freezing point than water to secure the safe working of the detection device even by cold weather.

When a covering strip is used to close the joint in the casing, it is preferred that the covering strip be of the same material as the casing in order to provide a better bond to the casing as by welding, polymerization, adhesion, melting, or the like, according to whether the material of the casing is metallic or synthetic resin or a laminate or the like.

As is set forth in greater detail in the copending application, the principle of detection is that in case of a crack in the pipeline, the hydrocarbon leaks out into the chamber within the casing and raises the fluid level in the chimney, the fluid flowing then through an overflow toward a discharge pipe. In that case, the hydrocarbon leaking out of the pipe is confined in the casing or the overflow and the discharge which can be controlled, thus avoiding any pollution danger for the environment. While by contrast, if the leak is in the casing itself, then the fluid in the casing tends to leak out and the level of fluid in the chimney falls. As the casing fluid is water, there is no pollution danger for the environment.

If desired, the casing can be reinforced with strands, strips, fabric and the like which are cast or wound about the casing to encircle it.

Sealed partitions are disposed at intervals along and between the pipe and the casing, thereby to separate the annular chamber into a plurality of chambers each having its own chimney and detection devices. These annular partitions increase the efficiency of the displacement of the fluid in the chambers toward the associated chimney and also reduce the static pressure from what it would be if the chamber were not thus subdivided. These annular partitions may comprise resilient joints, or two metal half rings secured to the pipe and tied down in the surrounding soil. It is also advantageous between the annular partitions to displace the longitudinal casing joints peripherally relative to each other, and to secure the adjacent ends of the casing sections to opposite sides of the annular partition. If desired, drain valves can be provided at the lower points in the annular casing, connected to a discharge pipe. These valves are to be used with precise pipe crack localization cables described in my above identified copending application.

Spacer members are provided within the annular chambers, on the one hand to center and separate the casing and the pipe relative to each other, so that the loads concentrated at any point are small, and on the other hand to partially fill the space between the pipe and the casing to reduce the volume of the liquid in the casing. These spacers provide intercommunicating channels and may be in the form either of ribs on the casing or of independent parts spaced around the pipe and retained in place by the casing.

When the pipelines are under water, or deeply buried in the sea floor, it may be advantageous to dispose at least a portion of the necessary ballast within the annular chambers.

The fluid within the annular chambers may be water with or without additives. In the case of a hydrocarbon lighter than water, the leaking hydrocarbon will tend to move to the associated chimney.

The chimneys are provided with overflow tubes connected to a discharge pipe that extends along the pipeline and terminates in a confirmation chamber. The testing of the liquid which moves into the confirmation chamber is accomplished by devices disclosed in greater detail in my above-identified copending application.

Other advantages will be apparent from the following disclosure which relates to the attached drawing showing the system formed by the pipeline and its casing.

FIG. 1 shows a longitudinal side cross sectional view of a section of the installation, whereas FIGS. 2, 3, 4 and 5 show transversal cross sections of the system.

Referring now to the drawing in greater detail, casing sections 2 and 3 are seen to surround but be spaced from a length of pipe 1. The casing sections 2 and 3 overlap along portions 2' and 3', respectively. A joint or gap in the casing sections is shown at 51, and is sealingly closed by a covering 4. Straps 5, for example strips of stainless steel, are tightened about the casing by appropriate tools.

The end of the chamber 9 or 9' formed between the casing and the pipe is closed by an annular partition 6. Another annular partition 7 is formed by a compressed resilient member. Metal partitions, on the other hand, enable anchoring the pipe to masses of concrete or rock.

A chimney as described above is shown at 15; although it will be understood that in practice, the chimney 15 is much smaller relative to the pipeline than is shown in the drawing, the enlargement being for clarity of illustration. Chimney 15 communicates with the annular chamber 9 through an opening 16. Chimney 15 is closed by an untight cover 19 and an inspection plate 20 which is not sealed, so that the fluid in chamber 9 will be at its static head above atmospheric pressure. The fluid in chamber 9 is a liquid in the illustrated embodiment, whose liquid level is shown at 17. A tube 18 contains detection equipment which will not be described in greater detail in the present application but is adequately described in the copending patent application identified above. An overflow 21 emerges from chimney 15 into a discharge pipe 22. A float 23 moves between normal upper and lower limits $h_1$ and $h_2$, respectively, when there is no break in either the pipeline or its casing. Above or below these limits, however, contacts I and II actuate the detector through electrical circuits as described in the copending application. The confirmation chamber and its equipment and function, shown at the upper left of FIG. 1, are also described in greater detail in the copending application.

FIGS. 2 to 5 show the pipe 1 and the casing 3, the chamber 9, and the covering 4 for the longitudinally extending joint 51. In FIG. 2, the spacer means consists of strips 53 connected together by strands. In FIG. 3, the spacer means consists of a corrugated sheet 54, preferably of plastic material. In FIG. 4, the spacer means is in the form of ribs 55 which are integral with the casing. In FIG. 5, the spacer means is in the form of rods 56 connected with one another at intervals as shown on the different section lines X—X and X'—X'. Along the latter section, ballasting 57 of cast iron or other scraps is shown.

From a consideration of the foregoing disclosure, therefore, it will be evident that all of the initially recited objects of the present invention have been achieved.

Although the present invention has been described and illustrated in connection with a preferred embodiment, it is to be understood that modifications, and variations may be resorted to without departing from the spirit of the invention, as those skilled in this art will readily understand. Such modifications and variations are considered to be within the purview and scope of the present invention as defined by the appended claims.

I claim:

1. A method for surrounding at least one length of tubing of a pipeline with a fluid contained in at least one tight annular chamber provided with spacers, said fluid in annular chamber at a static head above atmospheric pressure, comprising the steps of slipping an annular casing, made of plastic material and provided with a longitudinal slit, over the said tubing by temporarily widening a gap between the edges of the slit of said casing; closing said gap and sealing tightly the opposed edges of the said slit of the casing together; sealing the ends of the casing to terminal flanges sealed themselves to the tubing of the pipeline; boring at least one hole in the wall of the casing, providing said hole with a tubular outward extension at ambient pressure and filling the annular chamber with a fluid so as to detect leakage in either the pipeline or the annular casing.

2. A method as claimed in claim 1 in which several casing elements provided with a longitudinal slit are slipped over the tubing of the pipeline and positioned and sealed end to end to form the said casing.

3. A method as claimed in claim 1 in which at least one tight partition is further provided on the outer surface of the tubing of the pipeline and tightly sealed to the inside surface of the casing to provide at least two tight annular chambers around the tubing of the pipeline, a hole being bored in the wall of each chamber and provided with a tubular outward extension and each chamber being filled with a fluid.

4. A method as claimed in claim 1 in which the annular chamber is filled with demineralized water.

5. A method for surrounding, with plastic rings provided with at least one longitudinal split, at least one standard length of steel tube of a pipeline with at least one tight annular chamber containing a fluid at a static head above atmospheric pressure and spacers, said method consisting in distenting largely the opposed edges of the slit so as to encircle the steel tube, closing said edges and sealing tightly together said opposed edges, sealing tightly together said plastic rings so as to form a continuous casing, in sealing tightly the terminal flanks of the casing on the pipeline, boring in the casing at least one hole, in surrounding said hole with an extending tubular element, at ambient pressure and filling each chamber with a fluid so as to detect leakage in either the pipeline or the annular casing.

References Cited

UNITED STATES PATENTS

| | | | |
|---|---|---|---|
| 360,782 | 4/1887 | Ober | 138—114 X |
| 813,918 | 11/1906 | Schmitz | 138—114 X |
| 1,991,455 | 11/1935 | Gottwald | 138—106 X |
| 2,003,580 | 6/1935 | Craighead | 138—106 |
| 2,257,727 | 10/1941 | Bennett et al. | 138—99 |
| 2,438,441 | 3/1948 | Hollingsworth | 340—242 X |
| 2,613,166 | 10/1952 | Gronemeyer | 156—304 |
| 2,899,984 | 8/1959 | Gaffin | 138—99 |
| 3,126,918 | 3/1964 | Eaton | 138—114 X |

CARL D. QUARFORTH, Primary Examiner

G. SOLYST, Assistant Examiner

U.S. Cl. X.R.

138—99, 106; 156—392, 544